(12) United States Patent
Cheng et al.

(10) Patent No.: US 7,359,759 B2
(45) Date of Patent: Apr. 15, 2008

(54) METHOD AND SYSTEM FOR VIRTUAL METROLOGY IN SEMICONDUCTOR MANUFACTURING

(75) Inventors: Chang Yung Cheng, Tainan (TW); Hsueh-Shih Fu, Hsin-Chu (TW); Ying-Lang Wang, Tai-Chung County (TW); Fan-Tien Cheng, Tainan (TW)

(73) Assignee: Taiwan Semiconductor Manufacturing Company, Hsin-Chu (TW)

( * ) Notice: Subject to any disclaimer, the term of this patent is extended or adjusted under 35 U.S.C. 154(b) by 106 days.

(21) Appl. No.: 11/378,833

(22) Filed: Mar. 17, 2006

(65) Prior Publication Data
US 2007/0100487 A1 May 3, 2007

Related U.S. Application Data

(60) Provisional application No. 60/731,751, filed on Oct. 31, 2005.

(51) Int. Cl.
*G06F 19/00* (2006.01)
(52) U.S. Cl. ............... 700/121; 700/28; 700/108; 700/110
(58) Field of Classification Search ........... 700/28–31, 700/108–110, 121
See application file for complete search history.

(56) References Cited

U.S. PATENT DOCUMENTS

| | | | |
|---|---|---|---|
| 6,868,512 B1 * | 3/2005 | Miller et al. ............. | 714/724 |
| 6,917,849 B1 * | 7/2005 | Pasadyn et al. .......... | 700/121 |
| 6,999,836 B2 * | 2/2006 | Schwarm et al. ........ | 700/121 |
| 7,198,964 B1 * | 4/2007 | Cherry et al. ............ | 438/14 |
| 2005/0071039 A1 * | 3/2005 | Mitrovic .................. | 700/121 |
| 2005/0288812 A1 * | 12/2005 | Cheng et al. ............. | 700/109 |
| 2006/0047356 A1 * | 3/2006 | Funk et al. ............... | 700/121 |
| 2006/0129257 A1 | 6/2006 | Chen et al. | |
| 2007/0260350 A1 * | 11/2007 | Zagrebnov ................ | 700/121 |

* cited by examiner

*Primary Examiner*—Alexander Kosowski
(74) *Attorney, Agent, or Firm*—Haynes Boone, LLP

(57) ABSTRACT

Provided are a method and a system for virtual metrology in semiconductor manufacturing. Process data and metrology data are received. Prediction data is generated based on the process data and metrology data using a learning control model. The system for virtual metrology in a fabrication facility comprises a fault detection and classification system operable to receive process data, a statistical process control system operable to perform statistical process control on a history of physical metrology data to form metrology data, and a virtual metrology application operable to generate prediction data based on the process data and the metrology data using a learning control model.

7 Claims, 6 Drawing Sheets

METHOD AND SYSTEM FOR VIRTUAL METROLOGY IN SEMICONDUCTOR MANUFACTURING

CROSS-REFERENCE

The present application claims the benefit of U.S. Ser. No. 60/731,751, which was filed on Oct. 31, 2005, and is hereby incorporated by reference.

BACKGROUND

In the semiconductor manufacturing industry, metrology operations are performed for quality assurance purposes. These operations include process qualification, tool qualification, daily tool monitoring, periodical tool maintenance, tool recovery monitoring, process control monitoring, product monitoring, and the like. Currently, these operations are physically performed by humans with metrology tools. However, metrology tools are costly to obtain. In addition, extra human operations are required for operating the metrology tools besides the main processing steps. These extra operations lead to an increase in cycle time.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
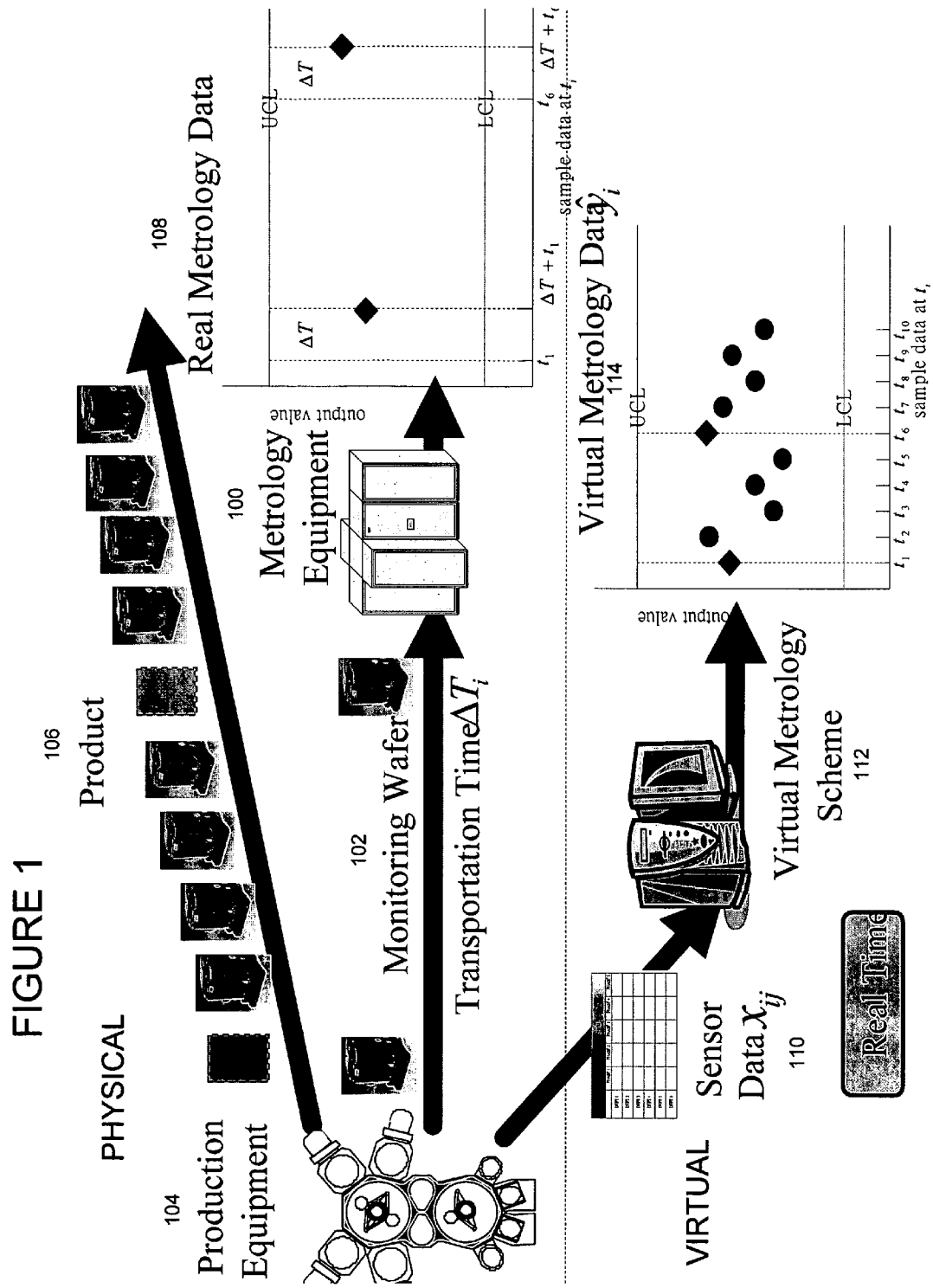
FIG. 1 is a diagram illustrating a comparison between physical metrology operations and virtual metrology operations.

It is to be understood that the following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Aspects of the present disclosure provide a system architecture for a virtual metrology application that may be used to convert equipment control system information into process and tool performance information in a fabrication facility ("fab"). The process and tool performance information is referred to as forecast data. This forecast data may be designed for use with various tools, such as 300 mm tools in a 300 mm fab, to replace or enhance existing physical metrology operations and tools.

In one illustrative embodiment, the virtual metrology application provides a data pre-processing mechanism that gathers measurement data from production equipment sensors in real time and pre-processes the data. More details regarding how data is pre-processed are discussed below with reference to FIG. 6. In addition, the virtual metrology application includes an interface that links with a statistical process control (SPC) system for learning of a control model. One way to produce a control model is by using an artificial neutral network (ANN). However, other methods, such as a learning model that produces a virtual metrology controller, may be used to produce a control model.

Furthermore, the virtual metrology application is a model learning application that integrates with other components to produce real time forecast data. These components include a statistical process control (SPC) system and a fault detection and classification (FDC) system. Once the forecast data is produced, the virtual metrology application automatically adjusts the attributes of the control model for learning using a self-adjustment mechanism that detects a difference between the forecast data and actual metrology data collected using the metrology tools.

FIG. 1 is a diagram illustrating a comparison between physical metrology operations and virtual metrology operations. As shown in FIG. 1, physical metrology operations are performed by metrology equipment 100, which measures the transportation time of a monitoring or a dummy wafer 102 produced by the production equipments 104. In addition, metrology equipment 100 inspects the quality of the monitoring wafer 102. However, physical metrology operations such as these require many control wafers. In addition, metrology equipment 100 is costly to obtain and extra human operations are required to operate the equipment, which can lead to an increase in cycle time. Other problems associated with metrology equipment 100, such as wafer exchange machine and sorter machine, include tool hangup and missed operations. More details regarding physical metrology operations are discussed below with reference to FIG. 2.

The virtual metrology application provided by the present disclosure may be used to replace the physical metrology operations that are performed by humans using metrology equipment 100 with virtual metrology operations. Examples of virtual metrology operations include preprocessing data obtained from a sensor 110 of production equipment 104 in real-time and employing a virtual metrology process 112 to produce virtual metrology data 114. In an illustrative embodiment, virtual metrology process 112 includes a model learning application that is integrated with other components to produce virtual metrology data 114.

Figure 2:
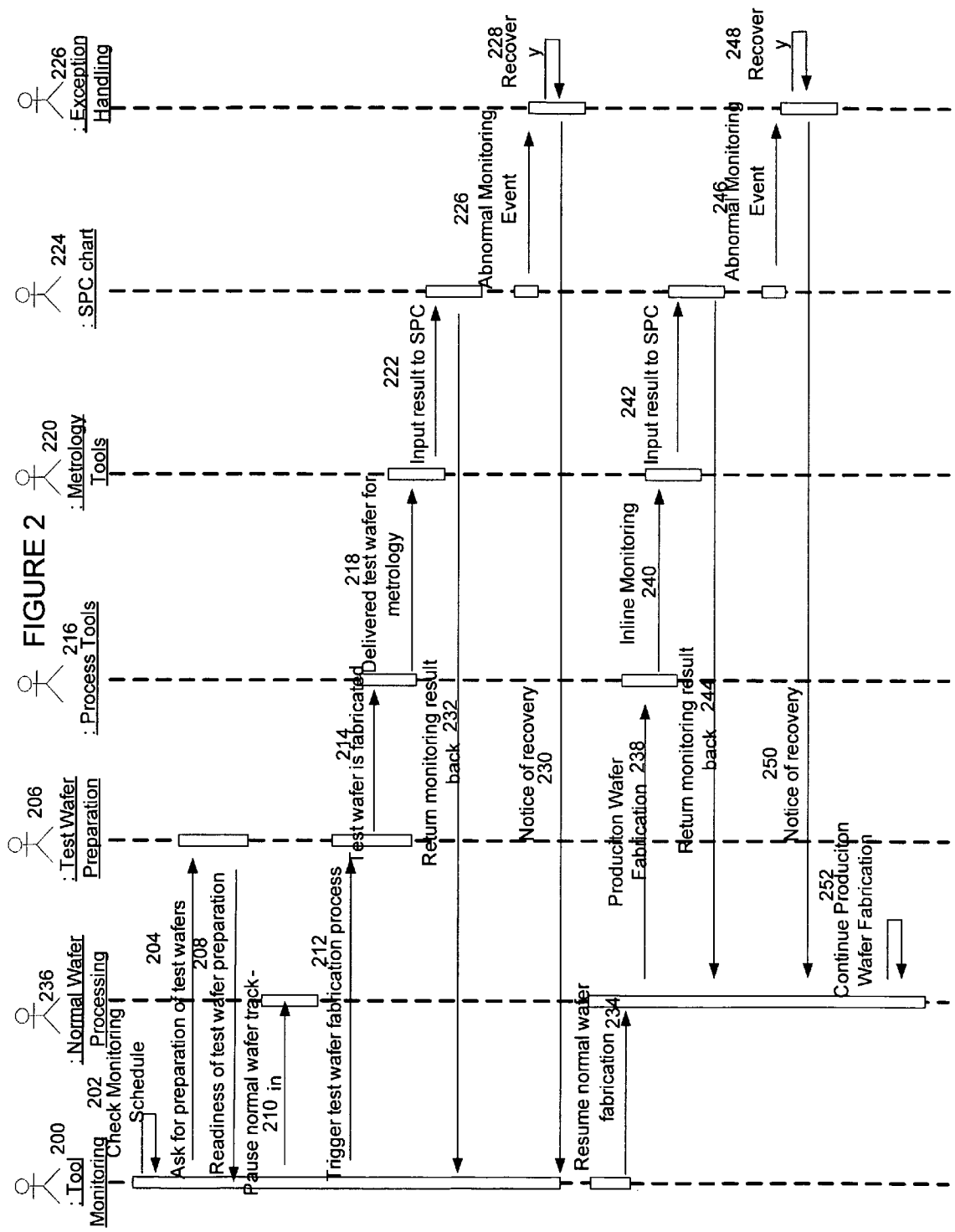
FIG. 2 is a diagram illustrating exemplary physical metrology operation scenario performed by metrology tools.

FIG. 2 is a diagram illustrating one embodiment of a physical metrology operation scenario that may be performed using metrology tools. As shown in FIG. 2, a tool monitoring operator 200 first checks a monitoring schedule 202. If monitoring schedule 202 indicates that a quality check is required, tool monitoring operator 200 requests preparation of a test wafer 204 from a test wafer preparation process 206. Test wafer preparation process 206 returns a readiness message of test wafer preparation process 208, which indicates that a test wafer is ready to be processed.

Tool monitoring operator 200 then pauses normal wafer tracking 210 in normal wafer processing 236 and triggers test wafer fabrication process 212 to test wafer preparation process 206. Test wafer preparation process 206 then fabricates test wafer 214 using process tools 216 and delivers the test wafer for metrology 218 to metrology tools 220. Metrology tools 220 then input the results to the SPC system in a SPC chart 224. The SPC 224 returns the tool monitoring result 232 back to tool monitoring operator 200 for analysis. In addition, the SPC 224 detects any abnormal monitoring events 226 based on the result and invokes exception handling 226 for recovery 228. Exception handling 226 then notifies tool monitoring operator 200 of the recovery 230.

Upon receiving the notification, tool monitoring operator 200 resumes normal wafer fabrication 234 in normal wafer processing 236. In normal wafer processing 236, process tools 216 perform inline monitoring 240 using metrology tools 220 and input the result to the SPC 242 to the SPC system in SPC chart 224. The SPC 224 returns the tool monitoring result 244 back to the normal wafer processing 236 for analysis. In addition, the SPC 224 detects any abnormal monitoring events 246 and invokes exception handling 226 for recovery 248. Exception handling 226 then notifies normal wafer processing 236 of the recovery 250 and normal wafer processing 236 continues the production of wafer fabrication 252. Thus, FIG. 2 illustrates that using metrology tools 220 to perform metrology operations requires significant time and effort from other areas of production.

Figure 3:
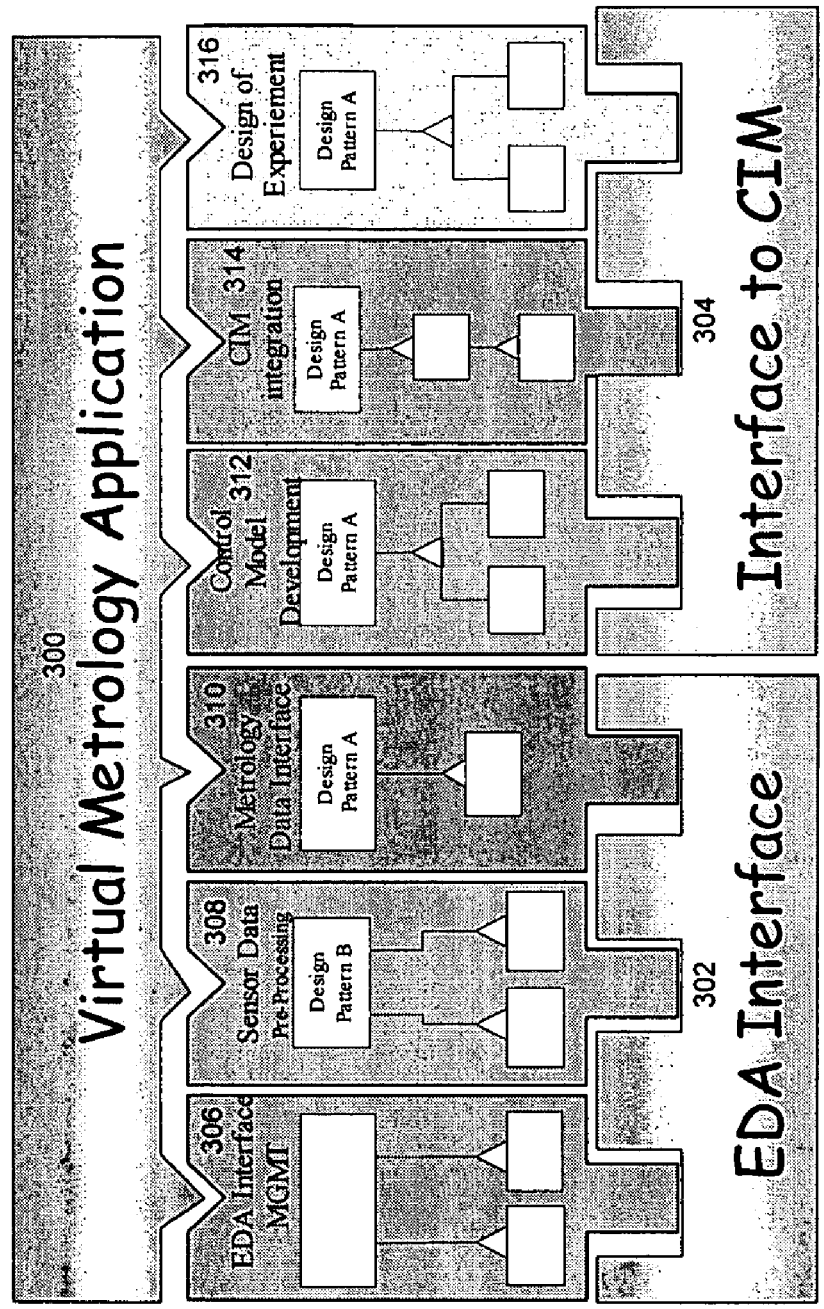
FIG. 3 is a diagram illustrating an embodiment of the virtual metrology application.

FIG. 3 is a diagram illustrating an embodiment of a virtual metrology application. The virtual metrology application is used to develop overall virtual metrology information. As shown in FIG. 3, in this exemplary implementation, a virtual metrology application 300 includes two interfaces: an electronic design assembly (EDA) interface 302 and an interface to common information model (CIM) 304.

EDA interface 302 includes a EDA interface management module 306 that manages the interface, a sensor data pre-processing mechanism 308, and a metrology data interface 310. Sensor data pre-processing mechanism 308 gathers data from sensors of the production equipment in real-time and pre-processes it. In addition to real-time sensor data, the sensor data pre-processing mechanism 308 may gather batch data and legacy data that are collected when the production equipment is offline. Metrology data interface 310 gathers actual metrology data collected by the metrology tools. The actual metrology data is used later to compare with the forecast data produced by virtual metrology application 300 to automatically adjust the attributes of the control model.

Common information model (CIM) is a common definition of management information for systems, networks, applications and services, and allows for vendor extensions. CIM's common definitions enable vendors to exchange semantically rich management information between systems throughout the network. In this exemplary implementation, the interface to CIM 304 includes a control model development module 312, a CIM integration module 314, and an experiment design module 316.

Control model developer module 312 develops a control model that is used to learn the tool monitoring data. In an illustrative embodiment, the control model developer module 312 may use an artificial neural network to produce the control model for learning. To produce the control model, learning from the artificial neural network modeling with FDC data and real daily monitoring data may be performed. Alternatively, other methods, such as a learning model that produces a virtual metrology controller, may also be used to produce the control model.

CIM integration module 314 integrates with other components, such as a SPC system, for metrology collection. In addition, CIM integration module 314 may integrate with a manufacturing execution system (MES) for running-hold. In this way, data from these systems may also be used to improve the learning capabilities of the control model. Based on the control model, experiment design module 316 designs experiments for the virtual metrology application 300.

Figure 4:
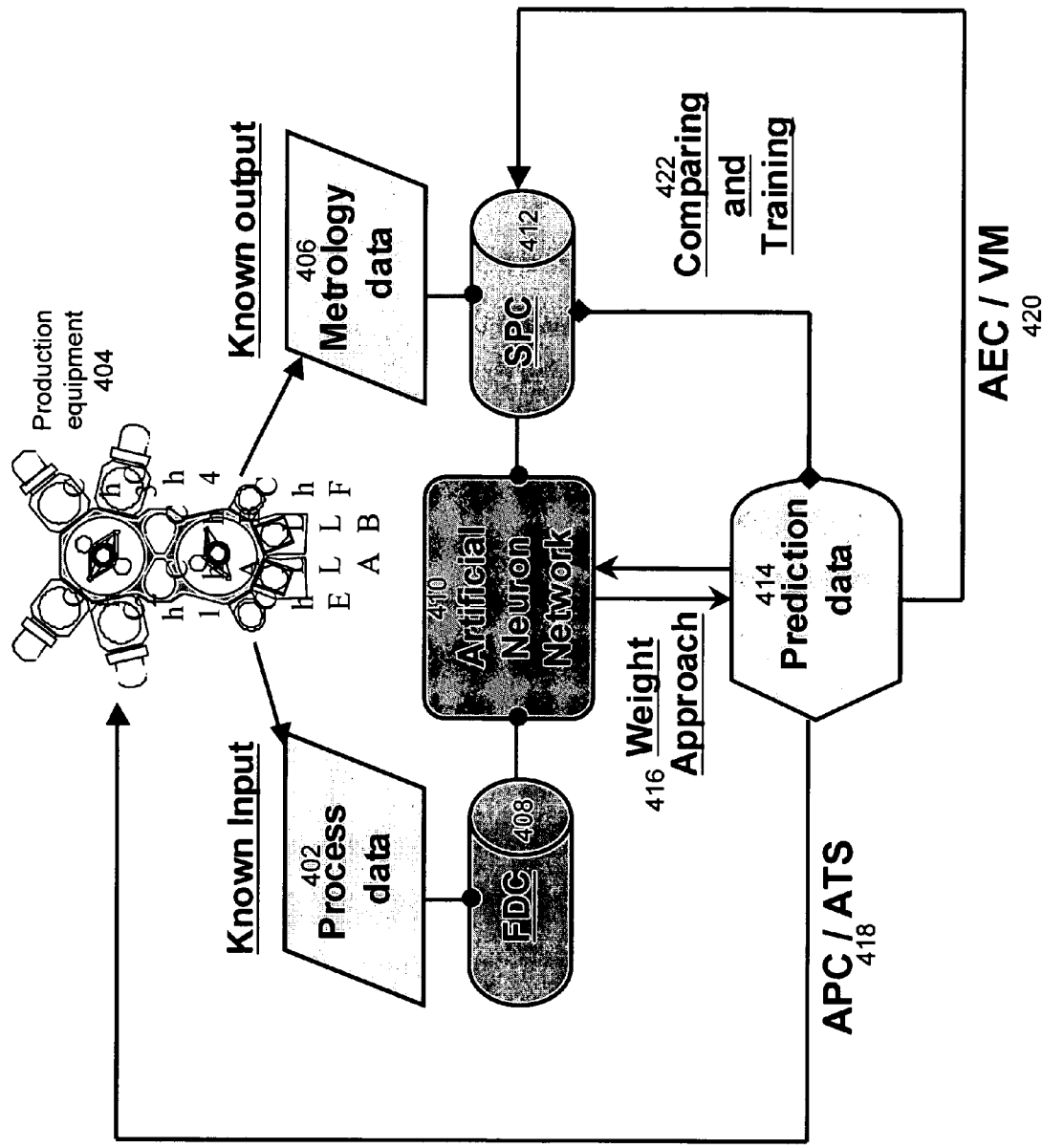
FIG. 4 is a diagram illustrating a system architecture of an embodiment of the virtual metrology application.

FIG. 4 is a diagram illustrating a system architecture of an embodiment of the virtual metrology application. In a manufacturing execution system (MES) based framework, production equipment 404 is used to process a wafer and generate process data 402. A FDC system 408 receives real time data from various sensors coupled to production equipment 404 and a sensor data pre-processor mechanism pre-processes the data to detect tool and process variations in order to identify a root cause. FDC system 408 then provides process data 402 to artificial neural network 410 for use in training the control model. Process data 402 become known inputs to artificial neural network 410.

A SPC system 412 performs statistical process control on a history of metrology data 406. A history of metrology data is produced by the physical metrology tools when production equipment 404 processes test wafers. The results of the statistical process control (SPC) are provided to the artificial neural network 410 to train the control model. The results become known outputs of artificial network 410. Using the control model produced by artificial neural network 410, forecast or prediction data 414 may be generated by the virtual metrology application based on a weight approach 416. The weight is provided to the neural network's training model automatically.

An artificial neural network (ANN) is an interconnected group of artificial neurons that uses a mathematical or computational model for information processing based on a connectionist approach to computation. Typically, there are at least three layers to a feedforward artificial neural network: an input layer, a hidden layer, and an output layer. The input layer is a data vector that is fed into the network. The input layer feeds into the hidden layer, which feeds into the output layer. The actual processing in the network occurs in the nodes of the hidden layer and the output layer. When enough neurons are connected together in the layers, the network can be trained to perform certain functions using a training algorithm. Aspects of the present disclosure leverage the advantages of this artificial neural network to generate forecast data from the process data (known inputs) and the metrology data (known outputs). The training algorithm is generated and stored within the artificial neural network. Thus, the whole neural network model is imported into the virtual metrology application for forecast.

Once prediction data 414 is generated using the control model, advanced equipment control (AEC) system and virtual metrology application 420 compares prediction data 410 with actual metrology data 406 to determine if a difference exists. If a difference exists between the data, advanced equipment control (AEC) system and virtual metrology application 420 returns the prediction data to SPC system 412 to better train the control model. In addition, advance processing control (APC) system 418 uses prediction data 414 to adjust one or more outputs to control production equipment 404 as defined by a recipe (e.g., a combination of such processing factors as duration, temperature, pressure, and fluid types and mixtures). In this way, the quality of processing the next iteration of a monitoring wafer may improve.

Figure 5:
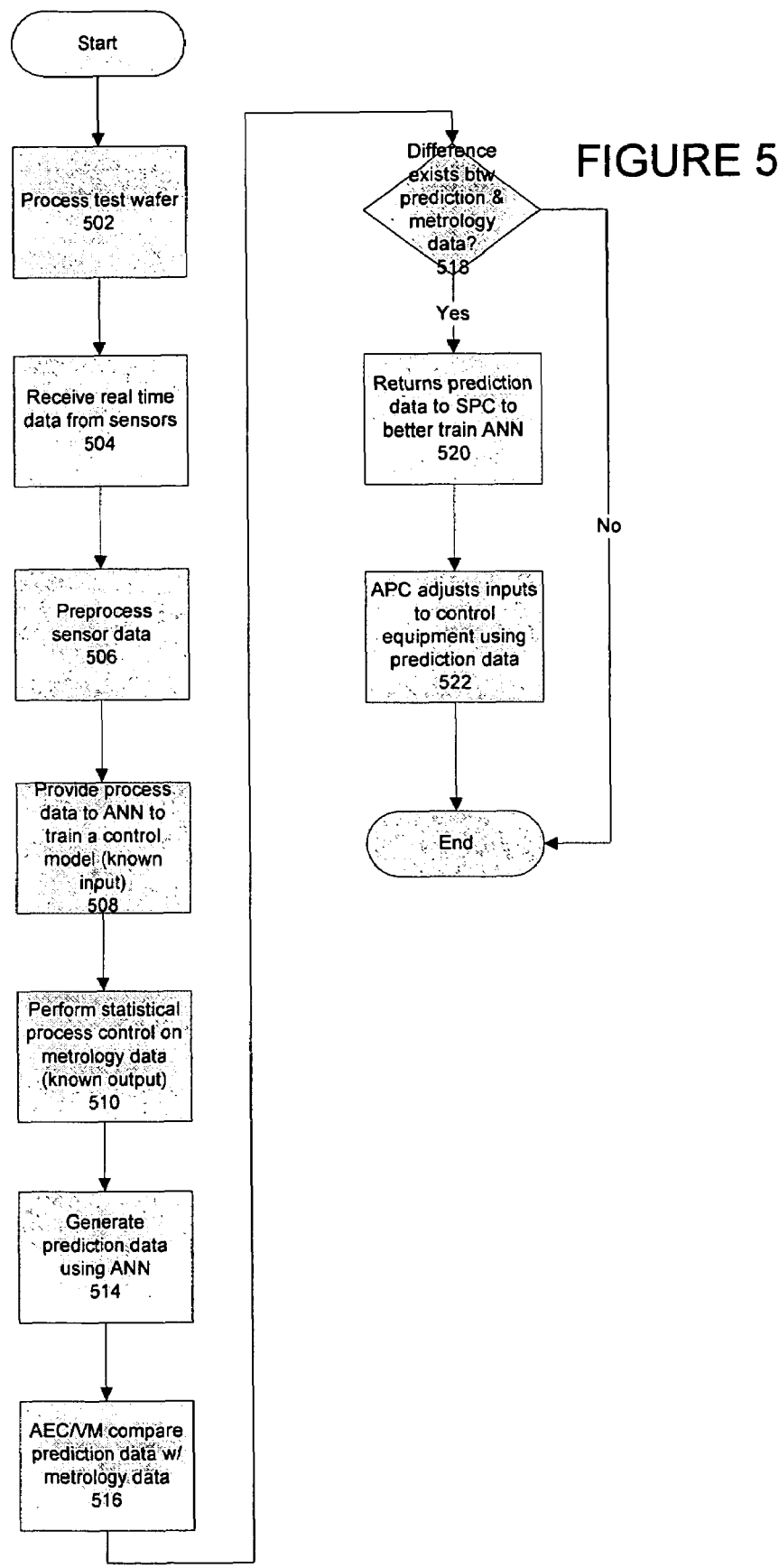
FIG. 5 is a process flowchart of an embodiment of the virtual metrology application.

FIG. 5 is a process flowchart of an embodiment of the virtual metrology application. As shown in FIG. 5, the process begins when a test wafer is processed by the production equipment (step 502). Next, real time sensor data is received from the production equipment (step 504) and the sensor data pre-processing mechanism pre-processes the sensor data (step 506). The process data is then provided to the artificial neural network to train a control model (step 508). The process data become known inputs to the artificial neural network.

The SPC system performs statistical process control on a history of metrology data that is generated from processing of the test wafer (step 510). The results of the statistical process control become known outputs of the artificial neural network. Based on the known inputs and known outputs, prediction data is generated using the control model produced by the artificial neural network (step 514). Subsequently, the advance equipment control and virtual metrology application compares the generated prediction data with the actual metrology data (step 516).

A determination is then made as to whether a difference exists between the prediction data and the metrology data (step 518). If no difference exists, the process terminates thereafter. However, if a difference exists, the virtual metrology application returns the prediction data to the SPC system to better train the control model (step 520). The advance processing control (APC) then adjusts one or more inputs to control the equipment using the prediction data (step 522), such that the quality of future test wafers may improve. The process terminates thereafter.

Figure 6:
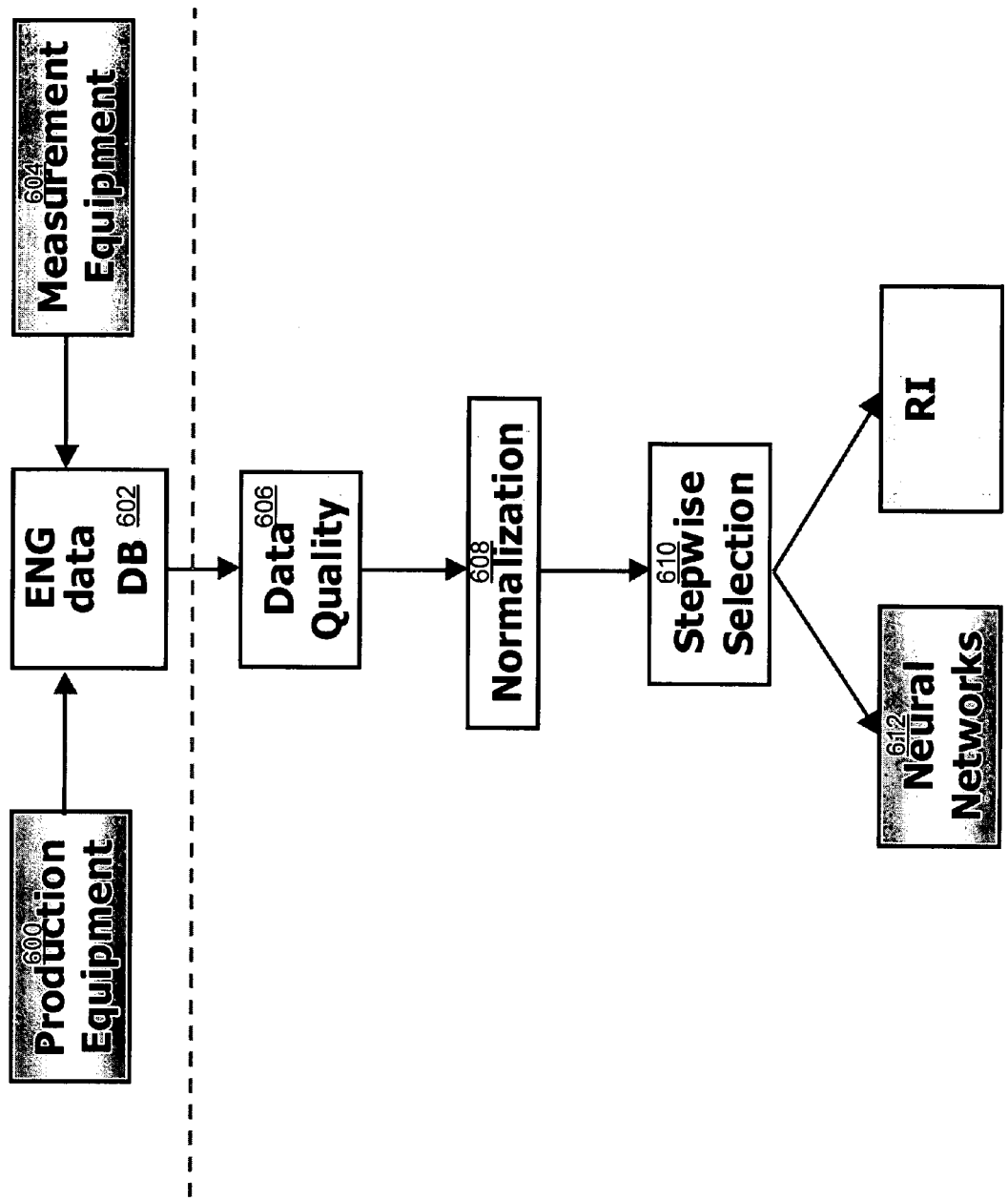
FIG. 6 is a block diagram illustrating pre-processing of data performed by an embodiment of the virtual metrology application.

FIG. 6 is a block diagram illustrating pre-processing of data performed by an embodiment of the virtual metrology application. As shown in FIG. 6, once data is collected by the virtual metrology application from production equipment 600, a database of engineering data 602, and measurement equipment 604, the virtual metrology application verifies the quality of data 606.

Next, the data is normalized 608 and a stepwise selection 610 is performed. Stepwise selection is a method that allows moves in either direction, dropping or adding variables at the various steps. Stepwise selection may be a forward selection, which starts by finding the best single feature, and committing to it. Then, given a set of selected features, a feature that improves performance the most is added first. Alternatively, stepwise selection may be a backward selection, which repeatedly deletes the feature that reduces performance the least from the set of remaining features. After stepwise selection 610 is performed, the results are provided to the neural networks 612 training model.

In summary, the virtual metrology operations described in the present disclosure may provide various benefits. Such benefits include providing a new quality assurance method without physical metrology operations. This new quality assurance method may help improve the fab cycle time by reducing real process or tool monitoring data when compared with external metrology. In addition, this new quality assurance method may help reduce the operating cost by reducing daily tool monitoring and product wafer monitoring frequency. Furthermore, this new quality assurance method may help improve the product yield by providing an integrated wafer quality forecast value. This value is a value that cannot otherwise be measured with production wafers. Moreover, this new quality assurance method may help reduce people loading by eliminating some wafer or tool monitoring. This new quality assurance method may help improve tool availability by reducing tool monitoring time and helps providing a tool prognostics system to support a prolonging tool monitoring cycle.

Embodiments of the disclosure can take the form of an entirely hardware embodiment, an entirely software embodiment, or an embodiment containing both hardware and software elements. In an illustrative embodiment, various aspects of the disclosure may be implemented in software, which includes but is not limited to firmware, resident software, microcode, etc.

Furthermore, embodiments of the disclosure may take the form of a computer program product accessible from a tangible computer-usable or computer-readable medium providing program code for use by or in connection with a computer or any instruction execution system. For the purposes of this description, a tangible computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, a semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and digital video disc (DVD).

Although embodiments of the present disclosure have been described in detail, those skilled in the art should understand that they may make various changes, substitutions and alterations herein without departing from the spirit and scope of the present disclosure. Accordingly, all such changes, substitutions and alterations are intended to be included within the scope of the present disclosure as defined in the following claims. In the claims, means-plus-function clauses are intended to cover the structures described herein as performing the recited function and not only structural equivalents, but also equivalent structures.

What is claimed is:

1. A computer program product, comprising:
a tangible computer-readable medium having encoded thereon a series of instructions for use by at least one computer, wherein the instructions are for establishing a learning control model in a virtual metrology application, and wherein the application comprises:
an electronic design assembly (EDA) interface including:
an EDA interface management module configured to manage the EDA interface;
a sensor data pre-processing mechanism configured to gather data from a plurality of production equipment sensors in real-time and pre-process the data; and
a metrology data interface configured to gather actual metrology data collected by a plurality of metrology tools, wherein the actual metrology data is compared with forecast data to automatically adjust attributes of the control model; and
a common information model (CIM) interface including:
a control model development module configured to develop a control model that learns tool monitoring data, wherein the control model development module uses an artificial neural network to produce a learning control model by learning from the artificial neural network modeling, fault detection and classification data, and real monitoring data;
a CIM integration module configured to integrate with a statistical process control (SPC) system for metrology data collection, and further configured to integrate with a manufacturing execution system (MES), wherein data from the SPC system and the MES is used to improve the learning capabilities of the learning control model; and an experiment design module configured to design experiments based on the learning control model.

2. The computer program product of claim 1 wherein the sensor data pre-processing mechanism is further configured to gather batch data and legacy data that are collected when the production equipment is offline.

3. The computer program product of claim 1 wherein the sensor data pre-processing mechanism is further configured to:

receive data from an engineering database;

verify qualities of the real time sensor data and the data from the engineering database; and normalize the real time sensor data and the data from the engineering database.

4. A semiconductor product manufacturing system, comprising:

a manufacturing execution system (MES) configured to control a plurality of production equipments to process a plurality of wafers, during which time the MES generates process data;

a fault detection and classification (FDC) system configured to receive real time data from a plurality of sensors each coupled to one of the plurality of production equipments, wherein the FDC includes a sensor data pre-processor mechanism configured to pre-process the real time data;

a statistical process control (SPC) system configured to perform statistical process control on metrology data produced by a plurality of physical metrology tools when the plurality of production equipments process the plurality of wafers;

an artificial neural network configured to process the pre-processed real time data received from the FDC system and results of the statistical process control received from the SPC system to produce and train a control model based on a training model, wherein the control model is configured to generate prediction data based on a weight approach which is automatically provided to the training model of the artificial neural network;

an advanced equipment control (AEC) system configured to compare the prediction data with the metrology data and, if a difference between the prediction data and the metrology data exists, provide the prediction data to the SPC system, thereby further training the control model; and an advance processing control (APC) system configured to use the prediction data to adjust control of the plurality of production equipments.

5. A semiconductor product manufacturing system, comprising:

a manufacturing execution system (MES) configured to control a plurality of production equipments to process a plurality of wafers, during which time the MES generates process data;

a fault detection and classification (FDC) system configured to receive real time data from a plurality of sensors each coupled to one of the plurality of production equipments, wherein the FDC includes a sensor data pre-processor mechanism configured to pre-process the real time data;

a statistical process control (SPC) system configured to perform statistical process control on a history of metrology data produced by a plurality of physical metrology tools when the plurality of production equipments process the plurality of test wafers, wherein results of the statistical process control are provided to the artificial neural network to train the control model; and an artificial neural network configured to process the pre-processed real time data received from the FDC system and results of the statistical process control received from the SPC system to produce and train a control model based on a training model, wherein the control model is configured to generate prediction data based on a weight approach which is automatically provided to the training model of the artificial neural network.

6. The semiconductor product manufacturing system of claim 5 further comprising an advanced equipment control (AEC) system configured to compare the prediction data with the metrology data and, if a difference between the prediction data and the metrology data exists, provide the prediction data to the SPC system, thereby further training the control model.

7. The semiconductor product manufacturing of claim 5 further comprising an advance processing control (APC) system configured to use the prediction data to adjust control of the plurality of production equipments.

* * * * *